United States Patent
Kim et al.

(10) Patent No.: US 8,055,978 B2
(45) Date of Patent: Nov. 8, 2011

(54) SEMICONDUCTOR MEMORY SYSTEM PERFORMING DATA ERROR CORRECTION USING FLAG CELL ARRAY OF BUFFER MEMORY

(75) Inventors: Sun Kwon Kim, Suwon-si (KR); Byeong Hoon Lee, Seoul (KR); Ki Hong Kim, Suwon-si (KR); Seung Won Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1118 days.

(21) Appl. No.: 11/830,461

(22) Filed: Jul. 30, 2007

(65) Prior Publication Data
US 2008/0184086 A1 Jul. 31, 2008

(30) Foreign Application Priority Data
Jan. 29, 2007 (KR) .................. 10-2007-0008911

(51) Int. Cl.
*G11C 29/00* (2006.01)
(52) U.S. Cl. ...................................................... 714/769
(58) Field of Classification Search .................. 714/769
See application file for complete search history.

(56) References Cited

U.S. PATENT DOCUMENTS

| | | | | |
|---|---|---|---|---|
| 3,434,116 A | * | 3/1969 | Anacker | 714/6.32 |
| 4,677,622 A | * | 6/1987 | Okamoto et al. | 714/756 |
| 5,121,395 A | * | 6/1992 | Millar | 714/762 |
| 5,237,460 A | * | 8/1993 | Miller et al. | 360/8 |
| 5,287,468 A | * | 2/1994 | Furuhashi et al. | 710/5 |
| 5,313,605 A | * | 5/1994 | Huck et al. | 711/3 |
| 5,359,569 A | * | 10/1994 | Fujita et al. | 365/229 |
| 5,388,076 A | * | 2/1995 | Ihara | 365/200 |
| 5,418,752 A | * | 5/1995 | Harari et al. | 365/218 |
| 5,459,850 A | * | 10/1995 | Clay et al. | 711/171 |
| 5,465,338 A | * | 11/1995 | Clay | 710/316 |
| 5,515,333 A | * | 5/1996 | Fujita et al. | 365/229 |
| 5,546,410 A | * | 8/1996 | Ando et al. | 714/764 |
| 5,603,001 A | * | 2/1997 | Sukegawa et al. | 711/103 |

(Continued)

FOREIGN PATENT DOCUMENTS
KR    1999028535    4/1999
(Continued)

OTHER PUBLICATIONS

Korean Office Action dated Jan. 28, 2008 from corresponding Korean Patent Application No. 10-2007-0008911.

*Primary Examiner* — Joseph D Torres
(74) *Attorney, Agent, or Firm* — F. Chau & Associates, LLC

(57) ABSTRACT

A buffer memory includes a memory cell array, a flag cell array, and a error correction block. The memory cell array has a plurality of word lines. Each of the plurality of word lines are electrically connected to a plurality of memory cells storing data. The flag cell array has a plurality of flag cells. Each of the plurality of flag cells is connected to each of the word lines and stores information that indicates whether error correction of the data has been performed. The error correction block performs error correction on the data output from the memory cell array in response to a command received through a host interface and flag data output from the flag cell array.

13 Claims, 6 Drawing Sheets

U.S. PATENT DOCUMENTS

| | | | | |
|---|---|---|---|---|
| 5,611,067 A * | 3/1997 | Okamoto et al. | 711/103 |
| 5,640,349 A * | 6/1997 | Kakinuma et al. | 365/185.33 |
| 5,671,229 A * | 9/1997 | Harari et al. | 714/710 |
| 5,673,383 A * | 9/1997 | Sukegawa | 714/6.13 |
| 5,742,934 A * | 4/1998 | Shinohara | 711/103 |
| 5,754,567 A * | 5/1998 | Norman | 714/773 |
| 5,822,251 A * | 10/1998 | Bruce et al. | 365/185.33 |
| 5,838,614 A * | 11/1998 | Estakhri et al. | 365/185.11 |
| 5,862,080 A * | 1/1999 | Harari et al. | 365/185.29 |
| 5,873,112 A * | 2/1999 | Norman | 711/103 |
| 5,907,856 A * | 5/1999 | Estakhri et al. | 711/103 |
| 5,928,370 A * | 7/1999 | Asnaashari | 714/48 |
| 5,930,815 A * | 7/1999 | Estakhri et al. | 711/103 |
| 5,946,714 A * | 8/1999 | Miyauchi | 711/205 |
| 5,953,737 A * | 9/1999 | Estakhri et al. | 711/103 |
| 5,956,743 A * | 9/1999 | Bruce et al. | 711/103 |
| 5,991,517 A * | 11/1999 | Harari et al. | 714/3 |
| 5,999,446 A * | 12/1999 | Harari et al. | 365/185.03 |
| 6,034,891 A * | 3/2000 | Norman | 365/185.09 |
| 6,088,755 A * | 7/2000 | Kobayashi et al. | 710/300 |
| 6,128,695 A * | 10/2000 | Estakhri et al. | 711/103 |
| 6,134,143 A * | 10/2000 | Norman | 365/185.09 |
| 6,134,631 A * | 10/2000 | Jennings, III | 711/117 |
| 6,144,607 A * | 11/2000 | Sassa | 365/230.03 |
| 6,145,069 A * | 11/2000 | Dye | 711/170 |
| 6,149,316 A * | 11/2000 | Harari et al. | 714/6.13 |
| 6,158,004 A * | 12/2000 | Mason et al. | 713/150 |
| 6,170,743 B1 * | 1/2001 | Okaue et al. | 235/380 |
| 6,172,906 B1 * | 1/2001 | Estakhri et al. | 365/185.11 |
| 6,202,138 B1 * | 3/2001 | Estakhri et al. | 711/168 |
| 6,223,308 B1 * | 4/2001 | Estakhri et al. | 714/42 |
| 6,226,202 B1 * | 5/2001 | Kikuchi | 365/185.33 |
| 6,262,915 B1 * | 7/2001 | Kihara et al. | 365/185.11 |
| 6,304,485 B1 * | 10/2001 | Harari et al. | 365/185.09 |
| 6,330,634 B1 * | 12/2001 | Fuse et al. | 711/103 |
| 6,345,333 B1 * | 2/2002 | Sassa et al. | 711/103 |
| 6,373,747 B1 * | 4/2002 | Harari et al. | 365/185.09 |
| 6,388,908 B1 * | 5/2002 | Araki et al. | 365/45 |
| 6,393,513 B2 * | 5/2002 | Estakhri et al. | 711/103 |
| 6,397,314 B1 * | 5/2002 | Estakhri et al. | 711/168 |
| 6,438,665 B2 * | 8/2002 | Norman | 711/159 |
| 6,460,111 B1 * | 10/2002 | Shinohara | 711/103 |
| 6,462,992 B2 * | 10/2002 | Harari et al. | 365/185.33 |
| 6,492,727 B2 * | 12/2002 | Nishizawa et al. | 257/723 |
| 6,501,173 B2 * | 12/2002 | Nishizawa et al. | 257/723 |
| 6,519,185 B2 * | 2/2003 | Harari et al. | 365/185.33 |
| 6,523,132 B1 * | 2/2003 | Harari et al. | 714/6.13 |
| 6,525,952 B2 * | 2/2003 | Araki et al. | 365/45 |
| 6,531,773 B2 * | 3/2003 | Nishizawa et al. | 257/723 |
| 6,560,143 B2 * | 5/2003 | Conley et al. | 365/185.04 |
| 6,601,140 B1 * | 7/2003 | Okaue et al. | 711/115 |
| 6,601,211 B1 * | 7/2003 | Norman | 714/773 |
| 6,618,789 B1 * | 9/2003 | Okaue et al. | 711/103 |
| 6,639,843 B2 * | 10/2003 | Miyauchi | 365/185.29 |
| 6,651,212 B1 * | 11/2003 | Katayama et al. | 714/763 |
| 6,711,663 B2 * | 3/2004 | Lai et al. | 711/206 |
| 6,725,321 B1 * | 4/2004 | Sinclair et al. | 711/103 |
| 6,728,851 B1 * | 4/2004 | Estakhri et al. | 711/168 |
| 6,731,537 B2 * | 5/2004 | Kanamori et al. | 365/185.08 |
| 6,751,123 B2 * | 6/2004 | Katayama et al. | 365/185.09 |
| 6,754,765 B1 * | 6/2004 | Chang et al. | 711/103 |
| 6,757,800 B1 * | 6/2004 | Estakhri et al. | 711/168 |
| 6,757,842 B2 * | 6/2004 | Harari et al. | 714/6.32 |
| 6,763,480 B2 * | 7/2004 | Harari et al. | 714/6.2 |
| 6,788,575 B2 * | 9/2004 | Kozakai et al. | 365/185.09 |
| 6,802,453 B1 * | 10/2004 | Okaue et al. | 235/492 |
| 6,805,297 B2 * | 10/2004 | Okaue et al. | 235/492 |
| 6,820,203 B1 * | 11/2004 | Okaue et al. | 713/193 |
| 6,859,856 B2 * | 2/2005 | Piau et al. | 711/103 |
| 6,868,022 B2 * | 3/2005 | Scheuerlein et al. | 365/201 |
| 6,868,032 B2 * | 3/2005 | Kozakai et al. | 365/230.03 |
| 6,914,846 B2 * | 7/2005 | Harari et al. | 365/230.03 |
| 6,917,547 B2 * | 7/2005 | Kanamori et al. | 365/200 |
| 6,944,703 B2 * | 9/2005 | Okaue et al. | 710/301 |
| 6,965,963 B1 * | 11/2005 | Nakanishi et al. | 711/103 |
| 6,981,136 B2 * | 12/2005 | Fuse et al. | 713/2 |
| 7,032,065 B2 * | 4/2006 | Gonzalez et al. | 711/103 |
| 7,062,618 B2 * | 6/2006 | Tsunoda et al. | 711/154 |
| 7,092,911 B2 * | 8/2006 | Yokota et al. | 705/57 |
| 7,102,943 B2 * | 9/2006 | Kanamori et al. | 365/200 |
| 7,116,578 B2 * | 10/2006 | Kanamori et al. | 365/185.08 |
| 7,118,044 B2 * | 10/2006 | Okaue et al. | 235/492 |
| 7,124,219 B2 * | 10/2006 | Tashiro | 710/72 |
| 7,137,027 B2 * | 11/2006 | Shiota et al. | 714/5.1 |
| 7,171,513 B2 * | 1/2007 | Gonzalez et al. | 711/103 |
| 7,185,208 B2 * | 2/2007 | Gorobets | 713/193 |
| 7,212,440 B2 * | 5/2007 | Gorobets | 365/185.11 |
| 7,230,859 B2 * | 6/2007 | Kozakai et al. | 365/189.05 |
| 7,266,017 B2 * | 9/2007 | Harari et al. | 365/185.22 |
| 7,266,664 B2 * | 9/2007 | Higuchi et al. | 711/173 |
| 7,275,144 B2 * | 9/2007 | Mukaida et al. | 711/220 |
| 7,283,397 B2 * | 10/2007 | Harari et al. | 365/185.22 |
| 7,290,082 B2 * | 10/2007 | Kwon | 711/103 |
| 7,315,916 B2 * | 1/2008 | Bennett et al. | 711/103 |
| 7,315,917 B2 * | 1/2008 | Bennett et al. | 711/103 |
| 7,340,581 B2 * | 3/2008 | Gorobets et al. | 711/202 |
| 7,360,715 B2 * | 4/2008 | Okaue et al. | 235/492 |
| 7,386,655 B2 * | 6/2008 | Gorobets et al. | 711/103 |
| 7,395,404 B2 * | 7/2008 | Gorobets et al. | 711/201 |
| 7,397,713 B2 * | 7/2008 | Harari et al. | 365/200 |
| 7,403,436 B2 * | 7/2008 | Kanamori et al. | 365/200 |
| 7,409,473 B2 * | 8/2008 | Conley et al. | 710/38 |
| 7,412,560 B2 * | 8/2008 | Smith et al. | 711/103 |
| 7,424,593 B2 * | 9/2008 | Estakhri et al. | 711/209 |
| 7,433,993 B2 * | 10/2008 | Sinclair | 711/103 |
| 7,441,067 B2 * | 10/2008 | Gorobets et al. | 711/103 |
| 7,441,090 B2 * | 10/2008 | Estakhri et al. | 711/159 |
| 7,444,460 B2 * | 10/2008 | Nakanishi et al. | 711/103 |
| 7,447,069 B1 * | 11/2008 | Harari et al. | 365/185.11 |
| 7,447,936 B2 * | 11/2008 | Shiota et al. | 714/6.1 |
| 7,450,420 B2 * | 11/2008 | Sinclair et al. | 365/185.11 |
| 7,460,399 B1 * | 12/2008 | Harari et al. | 365/185.04 |
| 7,461,199 B2 * | 12/2008 | Conley et al. | 711/103 |
| 7,472,251 B2 * | 12/2008 | Sasaki | 711/203 |
| 7,490,283 B2 * | 2/2009 | Gorobets et al. | 714/763 |
| 7,502,259 B2 * | 3/2009 | Gorobets | 365/185.11 |
| 7,511,646 B2 * | 3/2009 | Cornwell et al. | 341/126 |
| 7,525,852 B2 * | 4/2009 | Kozakai et al. | 365/189.09 |
| 7,549,013 B2 * | 6/2009 | Estakhri et al. | 711/103 |
| 7,551,486 B2 * | 6/2009 | Cornwell et al. | 365/185.22 |
| 7,558,887 B2 * | 7/2009 | Gower et al. | 710/33 |
| 7,568,135 B2 * | 7/2009 | Cornwell et al. | 714/721 |
| 7,584,308 B2 * | 9/2009 | Gower et al. | 710/35 |
| 7,594,157 B2 * | 9/2009 | Choi et al. | 714/764 |
| 7,613,043 B2 * | 11/2009 | Cornwell et al. | 365/185.18 |
| 7,639,531 B2 * | 12/2009 | Cornwell et al. | 365/185.03 |
| 7,639,542 B2 * | 12/2009 | Cornwell et al. | 365/185.2 |
| 7,676,640 B2 * | 3/2010 | Chow et al. | 711/162 |
| 7,701,797 B2 * | 4/2010 | Cornwell et al. | 365/226 |
| 7,817,480 B2 * | 10/2010 | Kozakai et al. | 365/189.09 |
| 7,861,014 B2 * | 12/2010 | Gower et al. | 710/35 |
| 7,877,539 B2 * | 1/2011 | Sinclair et al. | 711/103 |
| 7,877,540 B2 * | 1/2011 | Sinclair | 711/103 |
| 7,908,426 B2 * | 3/2011 | Estakhri et al. | 711/103 |
| 2003/0058733 A1 | 3/2003 | Mori | |
| 2006/0036897 A1 * | 2/2006 | Lin et al. | 714/5 |

FOREIGN PATENT DOCUMENTS

| | | |
|---|---|---|
| KR | 1020030053028 | 6/2003 |
| KR | 1020030092854 | 12/2003 |
| KR | 1020060023427 | 3/2006 |

* cited by examiner

SEMICONDUCTOR MEMORY SYSTEM PERFORMING DATA ERROR CORRECTION USING FLAG CELL ARRAY OF BUFFER MEMORY

CROSS-REFERENCE TO RELATED PATENT APPLICATION

This application claims priority under 35 U.S.C. §119 from Korean Patent Application No. 2007-0008911, filed on Jan. 29, 2007, the disclosure of which is hereby incorporated by reference herein as if set forth in its entirety.

BACKGROUND OF THE INVENTION

1. Technical Field

The present invention relates to a semiconductor memory system, and more particularly, to a semiconductor memory system performing data error correction.

2. Discussion of Related Art

A flash memory, such as a flash EEPROM, is a non-volatile memory that can electrically store or erase data. The flash memory may include a NAND flash memory and a NOR flash memory. The NOR flash memory may include a simple interface using a static random access memory (SRAM) or read only memory (ROM). In the NAND flash memory, the structure of the interface circuit is complicated as compared to the NOR flash memory, but a relative degree of integration is high and the cost is low.

FIG. 1 is a block diagram of a semiconductor memory system 100 having a NAND flash memory. Referring to FIG. 1, the semiconductor memory system 100 includes a NAND flash memory 110, a NAND flash interface 120, a state machine 130, an error correction logic 140, a buffer memory 150, a storage block 160, and a host interface 170.

The storage block 160 stores a command CMD and/or an address ADDR received through the host interface 170. The storage block 160 may be an internal register of the semiconductor memory system 100. The buffer memory 150 buffers data DATA output from the NAND flash interface 120 to the host interface 170.

The state machine 130 controls data input and/or output between the NAND flash interface 120 and the buffer memory 150 based on the command CMD and the address ADDR output from the storage block 160. The state machine 130 outputs the data DATA to the error correction logic 140 based on the command CMD and the address ADDR. The error correction logic 140 performs error correction on the data DATA and outputs a result thereof to the state machine 130.

When the data DATA is read out from the NAND flash memory 110, the error correction logic 140 performs error correction on the data DATA in real time. However, as the bandwidth of a data bus receiving data increases, there is a limit to the amount of data that can be error corrected in real time.

Thus, there is a need for a semiconductor memory system for performing error correction on data in real time.

SUMMARY OF THE INVENTION

According to an exemplary embodiment of the present invention a semiconductor memory system performs error correction on data stored in a buffer memory using a flag cell of the buffer memory after the data of a non-volatile memory is stored in the buffer memory.

According to an exemplary embodiment of the present invention, a semiconductor memory system includes a non-volatile memory, a non-volatile memory interface, a storage block, a buffer memory, and a state machine. The non-volatile memory stores data. The non-volatile memory interface communicates data with the non-volatile memory. The storage block stores a command and an address received through a host interface. The buffer memory stores data output from the non-volatile memory interface, performs error correction on the stored data, and outputs the error corrected data to the host interface. The state machine controls input and output of data between the non-volatile memory interface and the buffer memory based on the command and the address output from the storage block.

The buffer memory may include a memory cell array, a flag cell array, and an error correction block. The memory cell array has a plurality of word lines. Each of the word lines is connected to a plurality of memory cells to store a first data. The flag cell array has a plurality of flag cells respectively connected to the word lines and stores information indicating whether error correction of the first data has been performed. The error correction block performs error correction on the first data output from the memory cell array in response to a read command received through the host interface and a first flag data output from the flag cell array.

The error correction block may include a flag sense amplifier, a controller, and error correction logic. The flag sense amplifier amplifies and outputs the first flag data output from the flag cell array. The controller receives the amplified first flag data in response to the read command received through the host interface, generates an error correction enable signal and a wait signal based on the received first flag data, outputs one of the wait signal and the first data to the host interface. The error correction logic performs the error correction of the first data in response to the error correction enable signal and outputs a result of the error correction to the controller.

The error correction block may further include a flag write buffer which stores a second flag data output from the controller in the flag cell array based on a result of the error correction. The buffer memory may further include a driver which outputs the first data to the host interface in response to a data output enable signal output from the controller based on a result of the error correction.

The number of bit lines of the non-volatile memory may be the same as the number of bit lines of the buffer memory. The non-volatile memory interface may include a plurality of switching devices which connect each of the bit lines of the nonvolatile memory to a corresponding one of the bit lines of the buffer memory.

According to an exemplary embodiment of the present invention, a method of operating a semiconductor memory system including a non-volatile memory interface, a buffer memory, and a controller includes storing data output from the non-volatile memory interface in response to a command and an address received through a host interface, performing error correction on the stored data to generate error corrected data, outputting the error corrected data to the host interface, and controlling input and output of data between the non-volatile memory interface and the buffer memory based on the command and the address.

The performing of the error correction of the stored data may include amplifying and outputting first flag data output from a flag cell array, receiving the amplified first flag data in response to a read command received through the host interface, generating an error correction enable signal and a wait signal based on the received first flag data and outputting one of the wait signal and the stored data output from a memory cell array of the buffer to the host interface, and performing the error correction on the stored data in response to the error correction enable signal and outputting a result of the error correction to the controller.

The performing of the error correction on the stored data may include writing a second flag data output from the controller to a flag cell array of the buffer memory based on a result of the error correction. The performing of the error correction on the stored data may further include outputting the stored data to the host interface in response to a data output enable signal output from the controller based on a result of the error correction.

BRIEF DESCRIPTION OF THE DRAWINGS

The present invention will become more apparent by describing in detail exemplary embodiments thereof with reference to the attached drawings in which.

DETAILED DESCRIPTION OF EXEMPLARY EMBODIMENTS

Figure 1:
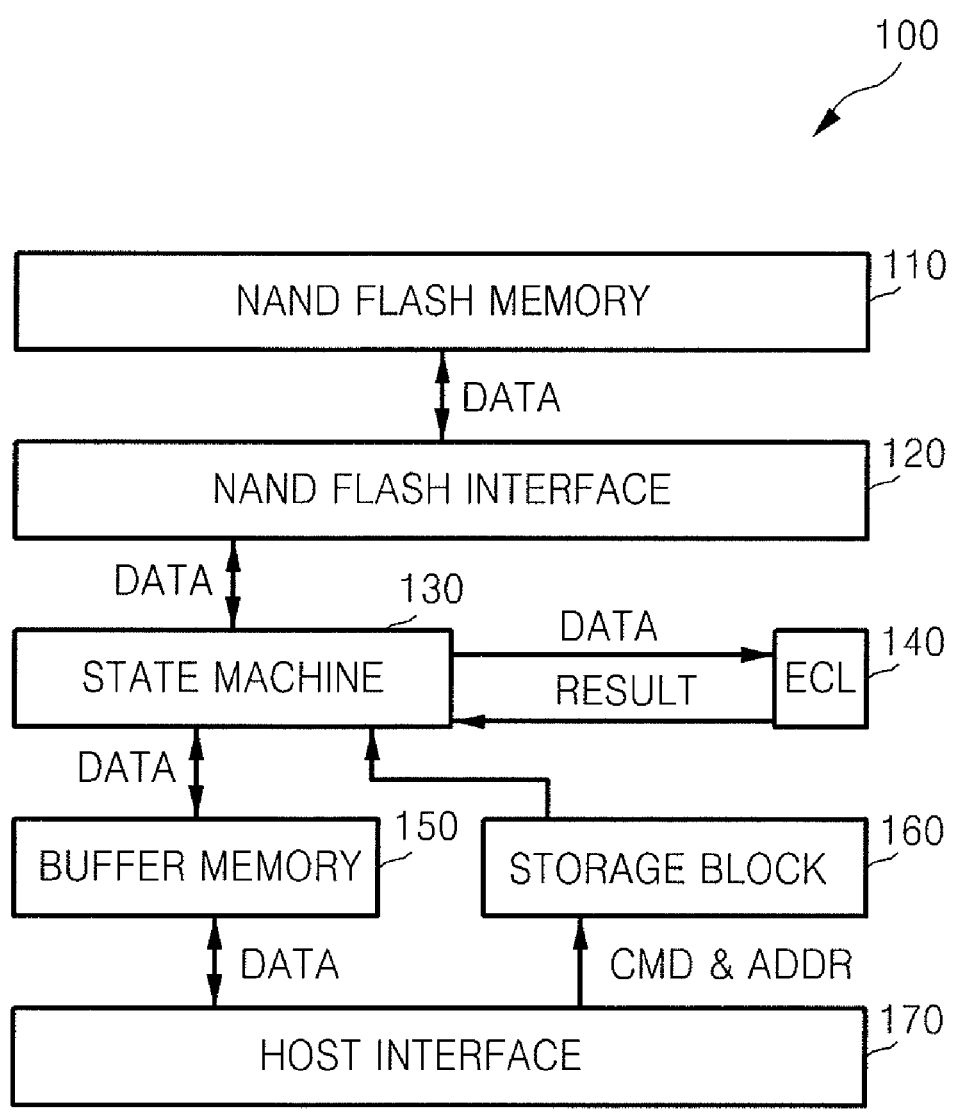
FIG. 1 is a block diagram of a semiconductor memory system.

Hereinafter, the present invention will be described in detail by explaining exemplary embodiments of the invention with reference to the attached drawings. Like reference numerals in the drawings denote like elements.

Figure 2:
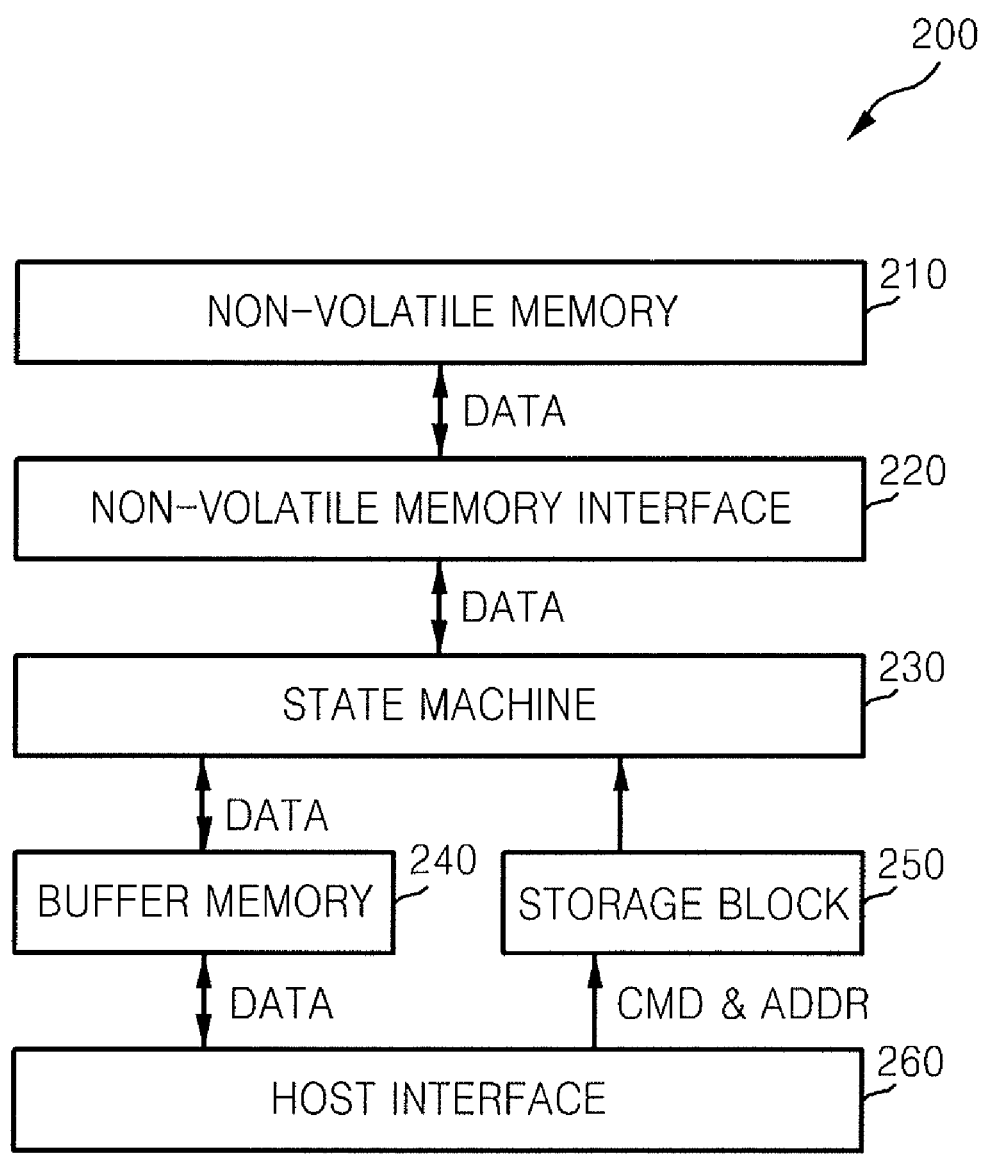
FIG. 2 is a block diagram of a semiconductor memory system according to an exemplary embodiment of the present invention.

FIG. 2 is a block diagram of a semiconductor memory system 200 according to an exemplary embodiment of the present invention. Referring to FIG. 2, the semiconductor memory system 200 includes a non-volatile memory 210, a non-volatile memory interface 220, a state machine 230, a buffer memory 240, a storage block 250, and a host interface 260.

The non-volatile memory 210 stores data DATA. The non-volatile memory interface 220 communicates the data DATA with the non-volatile memory 210. The non-volatile memory 210 can be a flash memory and the non-volatile memory interface 220 can be a flash memory interface. The storage block 250 receives and stores a command CMD and an address ADDR received through the host interface 260.

The buffer memory 240 receives and stores the data DATA output from the non-volatile memory interface 220 via the state machine 210, performs error correction on the stored data DATA, and outputs the error-corrected data DATA to the host interface 260. The buffer memory 240 can be embodied as, for example, a static random access memory (SRAM).

The number of bit lines of the non-volatile memory 210 can be the same as the number of bit lines of the buffer memory 240. The non-volatile memory interface 220 includes a plurality of switching devices to connect the bit lines of the non-volatile memory 210 to the corresponding bit lines of the buffer memory 240, respectively.

The bandwidth and the interfacing speed between the semiconductor devices may be increased by increasing the number of data lines, wherein the data lines interface between semiconductor devices. The state machine 230 controls the input and/or output of the data DATA between the non-volatile memory interface 220 and the buffer memory 240 based on the command CMD and the address ADDR output from the storage block 250.

Figure 3:
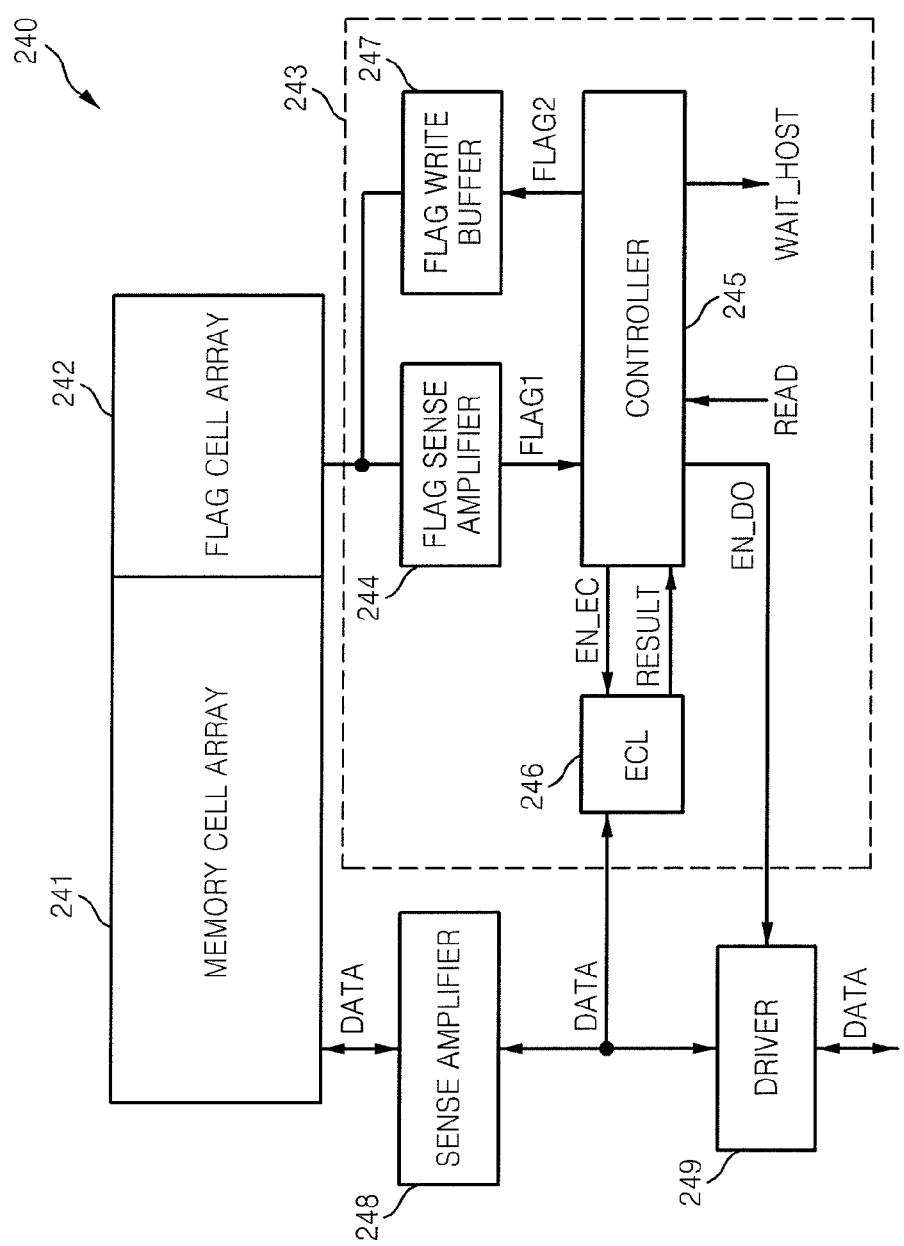
FIG. 3 is a block diagram of the buffer memory of FIG. 2.

FIG. 3 is a block diagram of the buffer memory 240 of FIG. 2. Referring to FIG. 3, the buffer memory 240 includes a memory cell array 241, a flag cell array 242, and an error correction block 243. The buffer memory 240 further includes a sense amplifier 248. The sense amplifier 248 may sense and amplify the data DATA output from the memory cell array 241. The memory cell array 241 includes a plurality of word lines (not shown), each of which is connected to each of a plurality of memory cells (not shown) storing the data DATA. The flag cell array 242 includes a plurality of flag cells (not shown) connected to the respective word lines. Each of the flag cells stores information indicating whether error correction on data DATA of a respective memory cell connected to a word line has been performed. The flag cells have the same structure as that of the memory cells.

Before error correction is performed on the data DATA of the memory cells connected to the respective word lines, the flag cell connected to each word line can be set to a default value, for example, a logical value "0".

When error correction has been performed on the data of the memory cells connected to the respective word lines, the flag cell connected to each of the word lines can be set to a different value, for example, a logical value "1". When a host (not shown) does not use the buffer memory 240, the buffer memory 240 sequentially performs error correction on the data stored in the memory cell array 241. Thus, the semiconductor memory system 200 can improve the performance of a system by performing error correction as a background job when the host is not using the buffer memory 240.

The error correction block 243 performs error correction on the data DATA output from the memory cell array 241 in response to a read command READ received through the host interface 260 and a first flag data FLAG1 output from the flag cell array 242. The error correction block 243 includes a flag sense amplifier 244, a controller 245, and error correction logic (ECL) 246. The flag sense amplifier 244 amplifies and outputs the first flag data FLAG1 output from the flag cell array 242.

The controller 245 receives the amplified first flag data FLAG1 in response to the read command READ received through the host interface 260, generates an error correction enable signal EN_EC and a wait signal WAIT_HOST. The controller 245 outputs the generated wait signal WAIT_HOST to the host interface 260 or outputs the data DATA to the host interface 260 based on the received first flag data FLAG1.

The ECL 246 performs error correction on the data DATA output from the memory cell array 241 via the sense amplifier 248 in response to the error correction enable signal EN_EC and outputs an error correction result RESULT to the controller 245. The error correction block 243 can further include a flag write buffer 247 to write a second flag data FLAG2 output from the controller 245 to a corresponding one of the flag cells, based on the error correction result RESULT.

In an initial state, the flag cells of the flag cell array 242 may be set to a default value, for example, a logical value "0". When error correction on the data DATA of a corresponding word line has been performed, the controller 245 outputs the second flag data FLAG2 having a logical value "1". Thus, the flag cell connected to the word line where the data error correction has been performed is set to the logical value "1". One of ordinary skill in the art would understand that different logical values may be used.

The buffer memory 240 can further include a driver 249 outputting the data DATA output from the memory cell array 241 to the host interface 260 in response to a data output enable signal EN_DO output from the controller 245 based on the error correction result RESULT.

Figure 4:
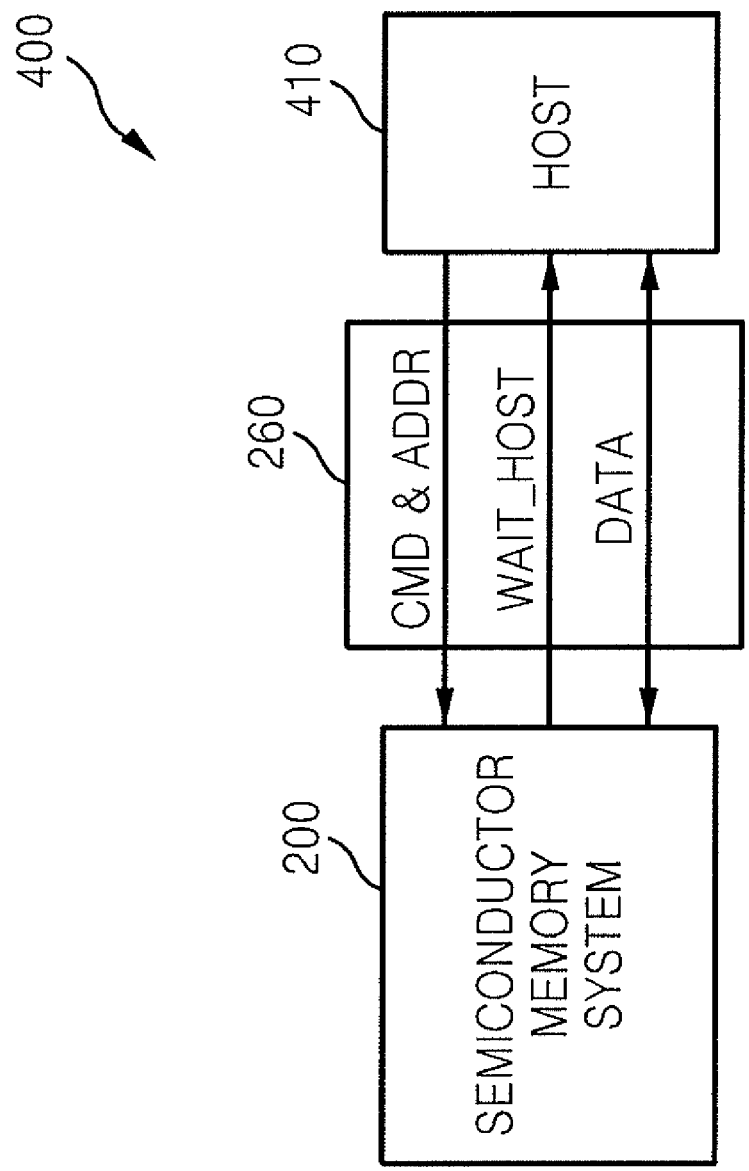
FIG. 4 is a block diagram of a memory card according to an exemplary embodiment of the present invention.

FIG. 4 is a block diagram of a memory card 400 according to an exemplary embodiment of the present invention. Referring to FIG. 4, the memory card 400 includes a semiconductor memory system 200, a host interface 260, and a host 410. The operation of the memory card 400 will be described with reference to FIGS. 2 through 4. The memory card 400 may be a memory card such as a smart card, a memory stick, a multi-media card (MMC), or a compact flash card.

The semiconductor memory system 200 and the host 410 are connected to each other via the host interface 260. The host 410 outputs the command CMD and the address ADDR. The semiconductor memory system 200 performs error correction on the data DATA output from the non-volatile memory interface 220 and outputs the error-corrected data DATA to the host interface 260 based on the command CMD and the address ADDR received through the host interface 260.

The semiconductor memory system 200 outputs the wait signal WAIT_HOST to the host 410 based on information that indicates whether error correction on the data DATA stored in the buffer memory 240 has been performed.

Figure 5:
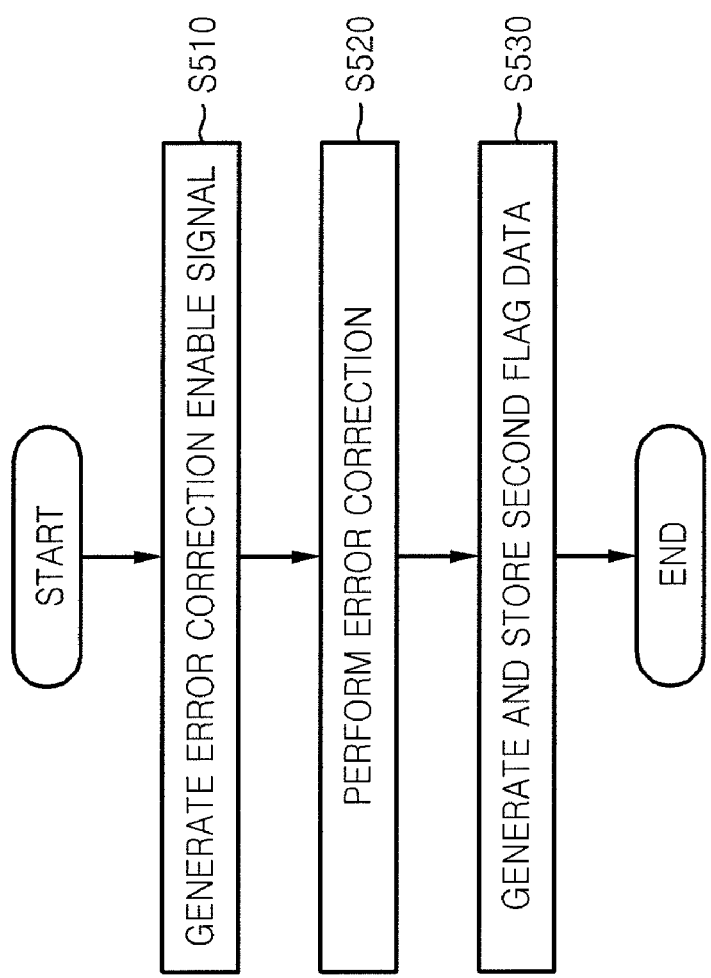
FIG. 5 is a flowchart which illustrates a method of performing error correction according to an exemplary embodiment of the present invention.
Figure 6:
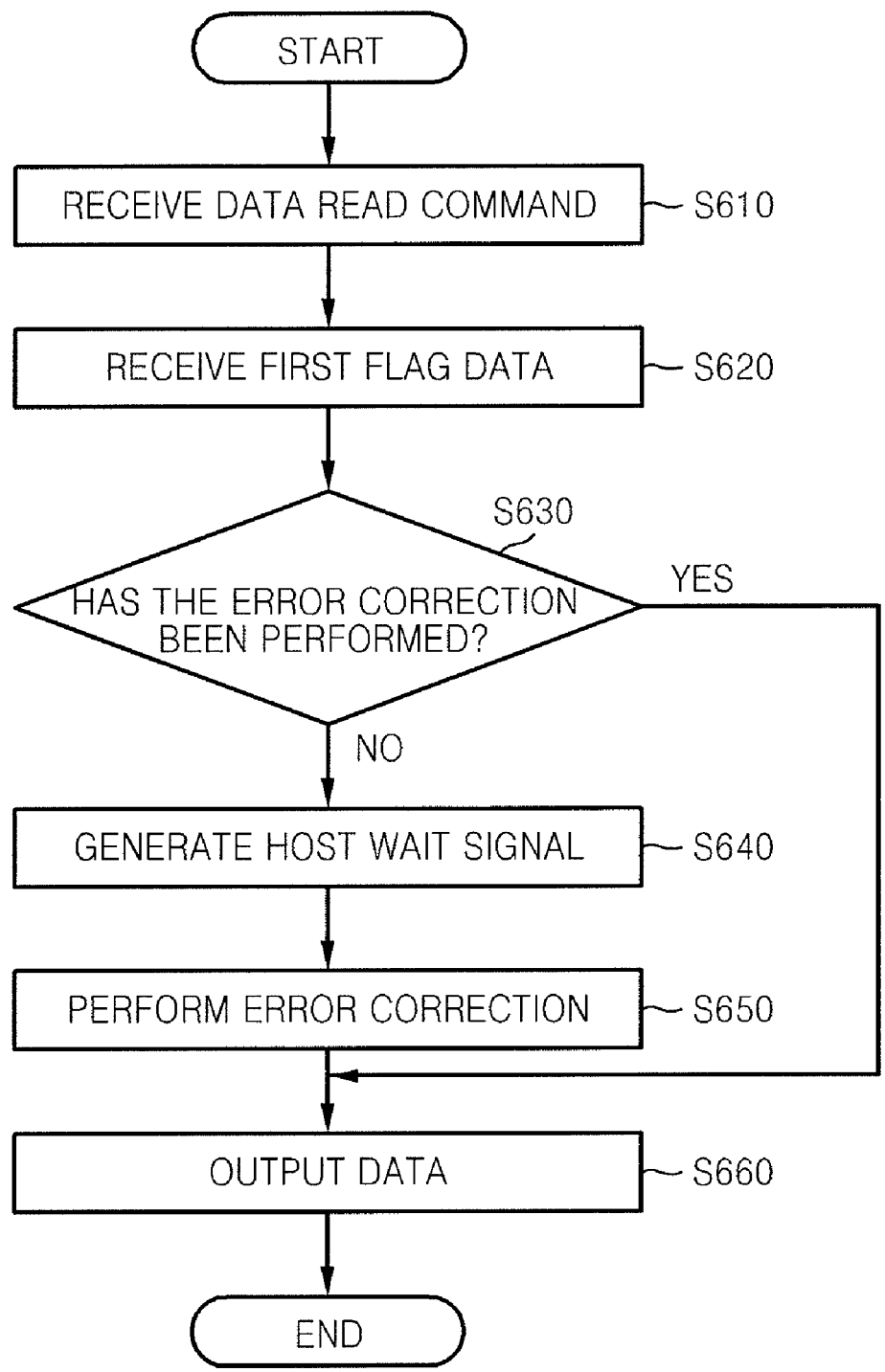
FIG. 6 is a flowchart which illustrates a method of performing error correction according to an exemplary embodiment of the present invention.

FIG. 5 is a flowchart which illustrates a method of performing data error correction according to an exemplary embodiment of the present invention. Referring to FIG. 5, the buffer memory 240 of the semiconductor memory system 200 performs error correction when the host 410 is not using the buffer memory 240. FIG. 6 is a flowchart which illustrates a method of performing data error correction according to an exemplary embodiment of the present invention. Referring to FIG. 6, the buffer memory 240 performs error correction when the host 410 outputs a read command READ.

Methods by which the buffer memory 240 performs data error correction will be described with reference to FIGS. 3 through 6. The method by which the buffer memory 240 performs the data error correction when the host 410 is not using the buffer memory 240 is described first. The buffer memory 240 sequentially performs error correction on the data DATA stored in the non-volatile memory 210.

The controller 245 generates an error correction enable signal EN-EC (S510). The ECL 246, in response to the error correction enable signal EC_EC, performs the error correction on the data DATA and outputs the error correction result RESULT to the controller 245 (S520). The controller 245 generates the second flag data FLAG2 having the logic value "1" based on the error correction result RESULT and the flag write buffer 247 stores the second flag data FLAG2 in a corresponding one of the flag cells (S530).

The method by which the buffer memory 240 performs the data error correction when the host 410 outputs a read command READ is described as follows. The controller 245 of the buffer memory 240 receives the read command READ from the host interface 260 (S610). The controller 245 receives the first flag data FLAG1 output from the flag sense amplifier 244 (S620).

The controller 245 determines whether error correction has been performed on the data DATA output from the ECL 246 based on the first flag data FLAG1. For example, the controller 245 may determine that error correction on the data DATA has been performed when the value of the first flag data FLAG1 is the logical value "1". When the value of the first flag data FLAG1 is the logical value "0", the controller 245 may determine that error correction on the data DATA has not been performed (S630).

When error correction on the data DATA has been performed, the controller 245 generates the data output enable signal EN_DO. The driver 249 outputs the data DATA to the host interface 260 (S660) in response to the data output enable signal EN_DO. When error correction on the data DATA has not been performed, the controller 245 outputs the wait signal WAIT_HOST to the host interface 260. The host 410, in response to the wait signal WAIT_HOST, stops the use of the buffer memory 240 (S640).

The controller 245 outputs the data output enable signal EN_DO. The ECL 246 performs error correction on the data DATA and outputs the error correction result RESULT to the controller 245. The controller 246 outputs the second flag data FLAG2 having the logical value "1" to the flag write buffer 247 based on the RESULT. The flag write buffer 247 stores the second flag data FLAG2 in a corresponding one of the flag cells (S650). The controller 245 generates the data output enable signal EN_DO. The driver 249 outputs the data DATA to the host interface 260 (S660) in response to the data output enable signal EN_DO.

Although embodiments of the present invention have been described with reference to a buffer memory interfacing between a host and a non-volatile memory, the present invention is not limited thereto, as the buffer memory may additionally interface to other electronic devices.

While this invention has been particularly shown and described with reference to exemplary embodiments thereof, it will be understood by those skilled in the art that various changes in form and details may be made therein without departing from the spirit and scope of the invention.

What is claimed is:

1. A buffer memory comprising:
    a memory cell array having a plurality of word lines, each of the plurality of word lines electrically connected to a plurality of memory cells storing first data;
    a flag cell array having a plurality of flag cells, each of the plurality of flag cells electrically connected to each of the word lines and storing information that indicates whether error correction of the first data has been performed; and
    an error correction block performing error correction on the first data output from the memory cell array in response to a command received through a host interface and a first flag data output from the flag cell array,
    wherein the error correction block comprises:
        a flag sense amplifier for receiving and amplifying the first flag data output from the flag cell array and for outputting amplified first flag data;
        a controller for receiving the amplified first flag data in response to the command received through the host interface, generating an error correction enable signal and a wait signal based on received first flag data and outputting one of the wait signal to the host interface and the first data to the host interface; and
        an error correction logic for performing the error correction of the first data in response to the error correction enable signal and for outputting a result of the error correction to the controller.

2. The buffer memory of claim 1, wherein the error correction block further comprises a flag write buffer for storing a second flag data output from the controller in the flag cell array based on a result of the error correction.

3. The buffer memory of claim 1, further comprising a driver for outputting the first data to the host interface in response to a data output enable signal output from the controller based on a result of the error correction.

4. A semiconductor memory system comprising:
a non-volatile memory to store data;
a non-volatile memory interface for communicating data with the non-volatile memory;
a storage block to store a command and an address received through a host interface;
a buffer memory to store data output from the non-volatile memory interface, to perform error correction on stored data, and to output error corrected data to the host interface; and
a state machine to control input and output of data between the non-volatile memory interface and the buffer memory based on the command and the address output from the storage block,
wherein the buffer memory comprises:
a first sense amplifier amplifying flag data output by a flag cell that indicates whether data of a memory cell is one of corrected or uncorrected;
a controller generating a signal in response to the command, wherein the signal enables correction when the amplified flag data indicates that the data is uncorrected, whereby the controller generates a wait signal for output to the host interface while an error correction logic is correcting the data; and
the error correction logic correcting the data in response to the signal via a second sense amplifier to output a correction result to the controller.

5. The semiconductor memory system of claim 4, wherein the buffer memory comprises:
a memory cell array having a plurality of word lines, each of the word lines connected to a plurality of memory cells storing first data; and
a flag cell array having a plurality of flag cells including the flag cell, each of the plurality of flag cells connected to each of the word lines and the flag cell storing the flag data.

6. The semiconductor memory system of claim 4, further comprises a flag write buffer for storing second flag data output from the controller based on the correction result to update the flag data in the flag cell.

7. The semiconductor memory system of claim 4, wherein the buffer memory further comprises a driver for outputting the data of the memory cell to the host interface in response to a data output enable signal output from the controller based on the correction result.

8. The semiconductor memory system of claim 4, wherein a number of bit lines of the non-volatile memory is the same as a number bit lines of the buffer memory.

9. The semiconductor memory system of claim 8, wherein the non-volatile memory interface comprises a plurality of switching devices which connect each of the bit lines of the nonvolatile memory to a corresponding one of the bit lines of the buffer memory.

10. The semiconductor memory system of claim 4, wherein the semiconductor memory system is a memory card.

11. A method of operating a semiconductor memory system including a non-volatile memory interface, a buffer memory, and a controller, the method comprising:
storing data output from the non-volatile memory interface in response to a command and an address received through a host interface;
performing error correction on the stored data to generate error corrected data;
outputting the error corrected data to the host interface; and
controlling input and output of data between the non-volatile memory interface and the buffer memory based on the command and the address,
wherein the performing of the error correction on the stored data comprises:
amplifying and outputting first flag data output from a flag cell array;
receiving amplified first flag data in response to a read command received through the host interface;
generating an error correction enable signal and a wait signal based on received first flag data and outputting one of the wait signal and the stored data output from a memory cell array of the buffer memory to the host interface; and
performing the error correction on the stored data in response to the error correction enable signal and outputting a result of the error correction to the controller.

12. The method of claim 11, wherein the performing of the error correction on the stored data comprises writing a second flag data output from the controller to a flag cell array of the buffer memory based on the result of the error correction.

13. The method of claim 12, wherein the performing of the error correction on the stored data further comprises outputting the stored data to the host interface in response to a data output enable signal output from the controller based on the result of the error correction.

* * * * *